(12) United States Patent
Christensen et al.

(10) Patent No.: US 6,350,133 B2
(45) Date of Patent: Feb. 26, 2002

(54) DISPLAY HOLDER

(75) Inventors: Morten Rolighed Christensen, Lyngby; Niels Peter Emme, Hellerup, both of (DK)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/785,449

(22) Filed: Feb. 20, 2001

(30) Foreign Application Priority Data

Feb. 21, 2000 (GB) ................................. 0004036

(51) Int. Cl.[7] ................................................ H01R 9/09
(52) U.S. Cl. ............................................ 439/66; 349/58
(58) Field of Search ....................... 439/66, 91; 349/58, 349/60, 149, 152

(56) References Cited

U.S. PATENT DOCUMENTS

| | | | | |
|---|---|---|---|---|
| 4,357,061 A | * | 11/1982 | Crosby | 439/66 |
| 5,163,837 A | | 11/1992 | Rowlette | |
| 5,219,293 A | | 6/1993 | Imamura | |
| 5,748,270 A | * | 5/1998 | Smith | 349/149 |
| 5,774,199 A | * | 6/1998 | Ozawa | 349/149 |
| 5,940,153 A | * | 8/1999 | Castaneda et al. | 349/58 |
| 6,091,474 A | * | 7/2000 | Milddleton et al. | 349/149 |

FOREIGN PATENT DOCUMENTS

WO 99/00877 1/1999

OTHER PUBLICATIONS

IBM Tech. Discl. Bulletin vol. 29 No. 7, Dec. 1986.

* cited by examiner

Primary Examiner—Brian Sircus
Assistant Examiner—Phuong KT Dinh
(74) Attorney, Agent, or Firm—Antonelli, Terry, Stout & Kraus, LLP

(57) ABSTRACT

A display holder for holding a display in relation to a printed circuit board, where the display holder has snapping apparatus for snapping the display onto the printed circuit board, and transferring apparatus for transferring a tension from a snap-connection to a connector part of the display. To accomplish the transferring of a tension the display holder has a beam having an extracted section in its vertical direction that transfers the tension from the snap-connection to the connector part of the display and the printed circuit board. The beam has supporting points and snapping flanges, where the flanges are snapped over the display and the printed circuit board to establish the connection. The display holder compresses an elastomer connector in the connector part, when it is applied to hold the display in relation to the printed circuit board. The elastomer connector enables a flexible and reliable connection, and the display holder ensures that it is kept in place, and ensures other physical stresses on the connection are avoided.

8 Claims, 6 Drawing Sheets

DISPLAY HOLDER

BACKGROUND OF THE INVENTION

The invention relates to a display holder for holding a display and a printed circuit board in relation to each other so that there can be good contact between the display and the printed circuit board.

Holding a display onto a printed circuit board and getting a good contact between the display and the printed circuit board has often caused problems, due to not very good holding means. The frame, used until now for holding the display onto the printed circuit board, is rather rigid and not flexible. It also can cause the display to crack if tensions occur in the printed circuit board due to some physical tension or stress.

Previously a rigid frame has been used, which presses equally on all the edges of the display. Between the frame and the display is a gasket, which is compressed when the frame is mounted to the printed circuit board to hold the display. The pressure on the display from the frame/gasket is the equal everywhere. The tolerance in manufacture of the frame and the printed circuit board is handled by the degree of compressing the gasket.

SUMMARY OF THE INVENTION

An object of the invention is to provide a display holder for holding a display in relation to a printed circuit board, enabling a secure contact between a display and a printed circuit board.

According to claimed invention this objective is obtained by a display holder for holding a display in relation to a printed circuit board, where the display holder has means for snapping the display onto the printed circuit board, and that the display holder furthermore includes means for transferring a tension from a snap-connection to a connector part of the display.

An object of the invention is to provide a communication unit provided with a display holder for holding a display in relation to a printed circuit board, enabling a secure contact between a display and a printed circuit board.

According to the claimed invention a communication unit provided with a display holder for holding a display in relation to a printed circuit board obtains this objective, where the display holder has means for snapping the display onto the printed circuit board, and that the display holder furthermore includes means for transferring a tension from a snap-connection to a connector part of the display.

BRIEF DESCRIPTION OF THE DRAWINGS

The invention will be explained more fully below, by way of example, in connection with preferred embodiments and with reference to the drawing, in which.

DETAILED DESCRIPTION OF THE INVENTION

Figure 1:
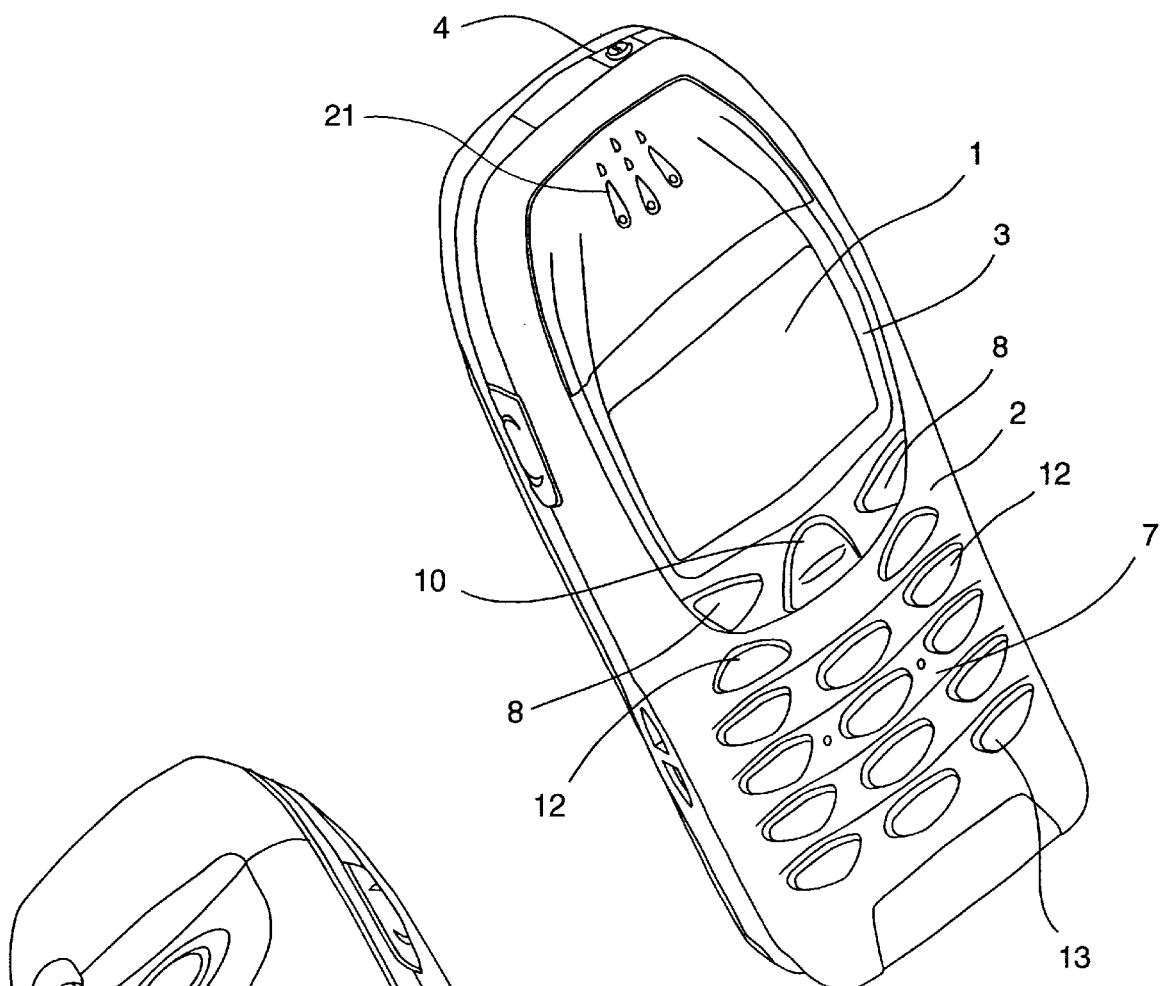
FIGS. 1–2 shows in a perspective view a preferred embodiment of the communication unit according to the invention.
Figure 2:
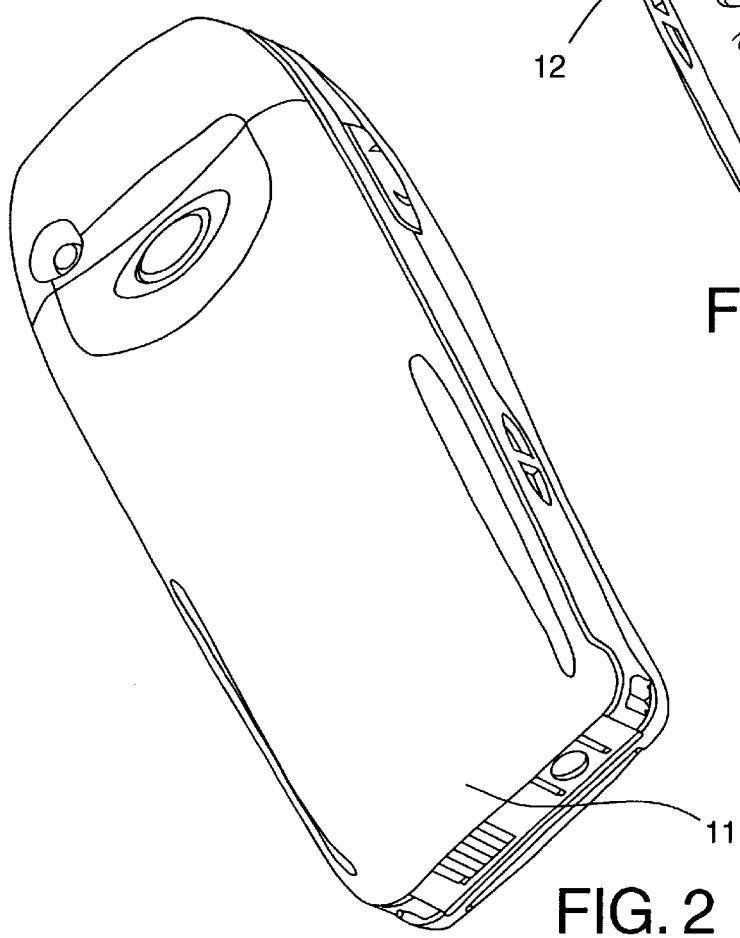

According to a first aspect the display holder according to the invention will be described with reference to a hand portable phone, preferably a cellular/mobile phone. A preferred embodiment of this phone is shown in FIG. 1, where a phone is shown in perspective. In FIG. 2 is the phone shown for another perspective. As will be seen, the phone is provided with a front cover 2 having a window frame 3 encircling the protection window of the display assembly 1. The phone comprises a user interface having an on/off button 4, a keyboard/keypad 7, a battery, a display/LCD 1, an ear-piece 21 and a microphone 22 (not shown).

The keypad 7 has a first group of keys 13 as alphanumeric keys, by means of which the user can enter a telephone number, write a text message (SMS), write a name (associated with the phone number), etc. Each of the twelve alphanumeric keys 13 is provided with a figure "0–9" or a sign "#" or "*", respectively. In alpha mode each key is associated with a number of letters and special signs used in the text editing.

The keypad 2 additionally comprises two soft keys 8, two call handling keys 12, and a navigation key 10. The functionality of the soft key depends on the state of the phone and the navigation in the menu by using a navigation key. The present functionality of the soft keys 8 is shown in separate fields in the display 1 just above the keys 8. The two call handling keys 12 are used for establishing a call or a conference call, terminating a call or rejecting an incoming call.

The navigation key 10 is an up/down key and is placed centrally on the front surface of the phone between the display 3 and the group of alphanumeric keys 8. Hereby the user will be able to control this key with his thumb. This is the best site to place an input key requiring precise motor movements. Many experienced phone users are used to one-hand handling. They place the phone in the hand between the fingertips and the palm of the hand. Hereby the thumb is free for inputting information.

Figure 3:
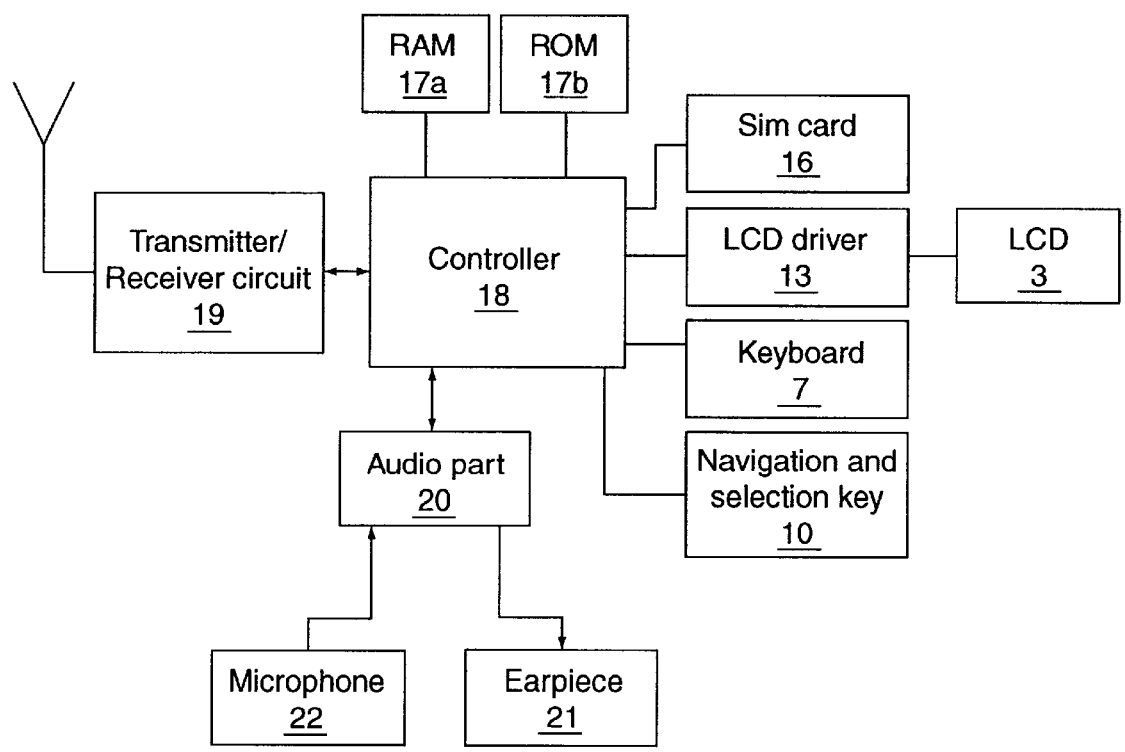
FIG. 3 schematically shows the essential parts of a telephone for communication with a cellular network.

FIG. 3 schematically shows the most important parts of a preferred embodiment of the phone, said parts being essential to the understanding of the invention. The microphone 22 records the user's speech, and the analogue signals formed thereby are A/D converted in an A/D converter (not shown) before the speech is encoded in an audio part 20. The encoded speech signal is transferred to the controller 18 (physical layer processor), which e.g. supports the GSM terminal software. The controller 18 also forms the interface to the peripheral units of the apparatus, including RAM and ROM memories 17a and 17b, a SIM card 16, the display 1 and the keypad 7 (from FIG. 1) as well as data, power supply, etc. The controller 18 communicates with the transmitter/receiver circuit 19. The audio part 20 speech-decodes the signal, which is transferred from the controller 18 to the ear-piece 21 via a D/A converter (not shown).

The preferred embodiment of the phone of the invention is adapted for use in connection with the GSM network, but, of course, the invention may also be applied in connection with other phone networks. It could be cellular networks, various forms of cordless phone systems or in dual band phones accessing sets of these systems/networks.

The controller 18 is connected to the user interface. Thus, it is the controller 18, which monitors the activity in the phone and controls the display 1 in response thereto.

Therefore, it is the controller 18, which detects the occurrence of a state change event and changes the state of the phone and thus the display text. The user may cause a state change event, when he/she activates the keypad 7 including the navigation key or keys 10, and these type of events are called entry events or user events. However, the network communicating with the phone may also cause a state change event. These type of events and other events beyond the user's control are called non-user events. Non user events comprise status change during call set-up, change in battery voltage, change in antenna conditions, message on reception of SMS, etc.

An embodiment of the invention will be described with reference to FIGS. 3 to 11 showing the various features of a display holder. In the shown embodiment the display holder will be holding a liquid crystal display in relation to a printed circuit board.

Figure 4:
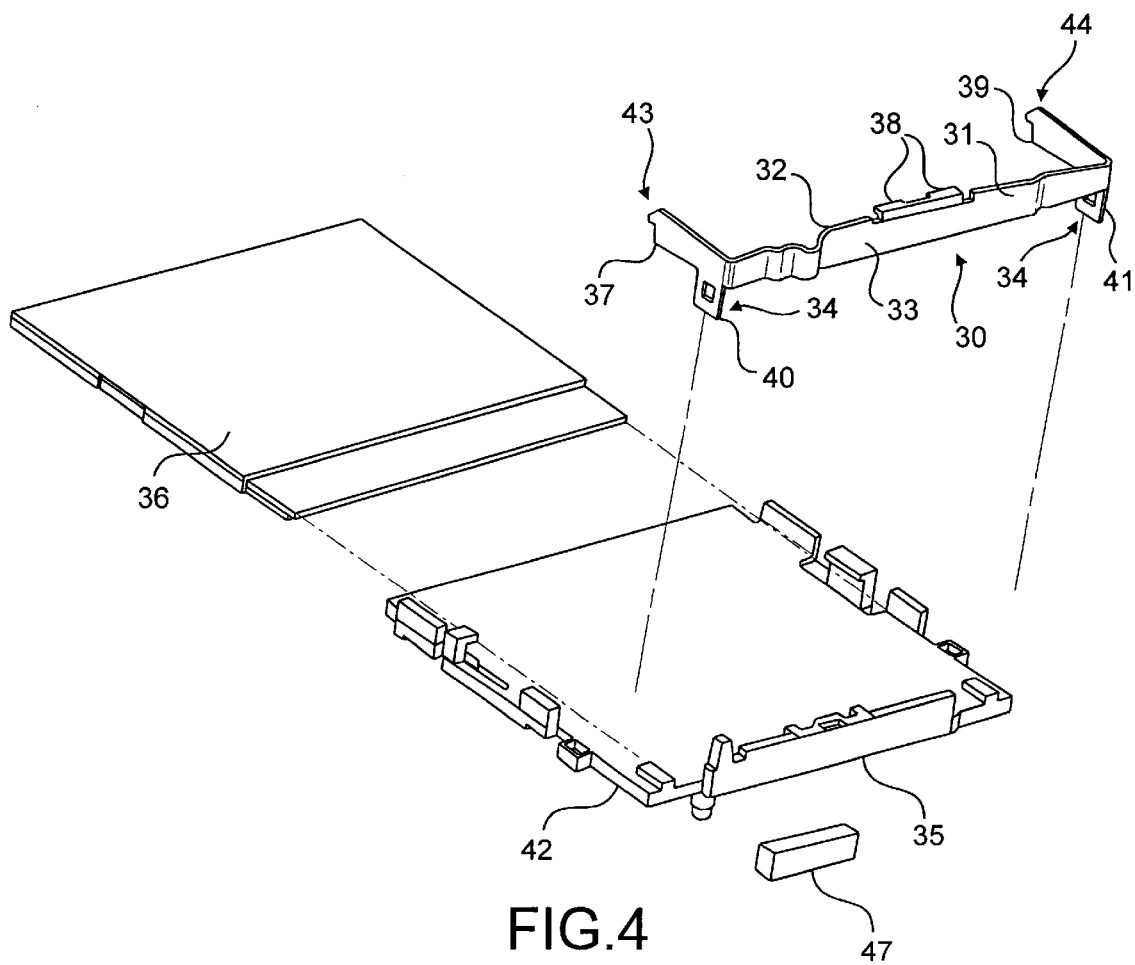
FIG. 4 shows display assembly parts, not assembled.
Figure 5:
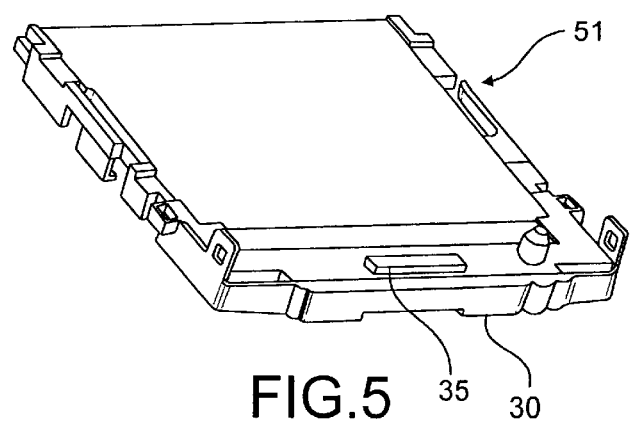
FIG. 5 shows the surface of an assembled frame facing the printed circuit board.
Figure 6:
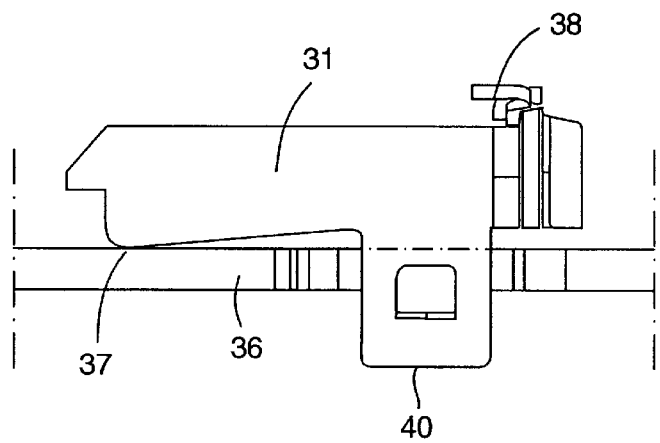
FIG. 6 shows a section of a display holder mounted on a printed circuit board.

In FIG. 4 a display holder 30 is shown including a beam 31 having a U-shaped plane 32. The beam 31 has an extracted or offset section 33 vertical to the U-shaped plane 32 to be able to transfer a tension from a snap-connection 34 to a connector part 35 of the display 36 and the printed circuit board 60 (see FIG. 9) in the direction to transfer the tension without bending. If the display holder 30 had the same design and the tension had been parallel to the U-shaped plane 32 the display holder 30 should bend due to tension, and not be able to transfer a tension to the conductor part 35.

The beam 31 includes three supporting points 37, 38 and 39, and two snapping flanges 40 and 41. The flanges 40 and 41 are snapped over the display 36 and the printed circuit board 60 to establish a connection, while the supporting points 37, 38 and 39 are supported at the display 36 and a frame 42 whereon the display 36 is mounted. The frame 42 houses a light guide. By having some distance between the beam 31 and the display 36 (see FIG. 6), except for the supporting points 37, 38 and 39, the display 36 will be more flexible and will better adjust to external forces without cracking or jeopardising the connection between the display 36 and the printed circuit board 60. The distance also enables the display 36 to move independently from the frame 42.

As mentioned earlier the beam 31 has a U-shaped plane 32 with an extracted section 33 from said plane 32. The beam 31 has a supporting point 37 and 39 to the light guide 42 and a snap flange 40 and 41 on each of the outer parts 43 and 44 of the beam 31, and a supporting point 39 to the connector part 35 on the middle part of the beam 31. The supporting point 39 to the connector part 35 projects from the beam 31. The beam 31 is in this embodiment made of metal, but could obviously be made of any other material having the same characteristic using the same design. These materials could e.g. be wood or plastic.

Figure 7:
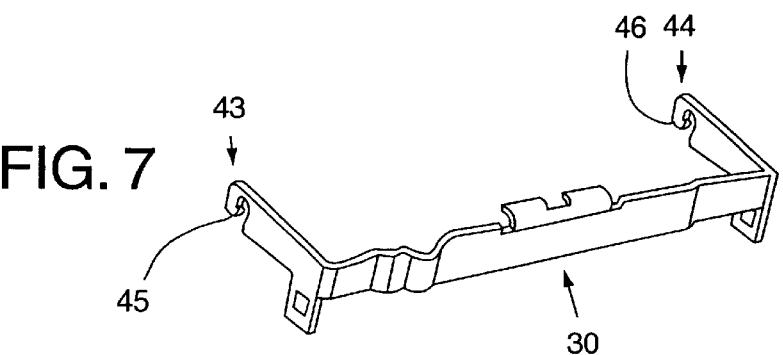
FIG. 7 shows a perspective view of an embodiment of the display holder.
Figure 8:
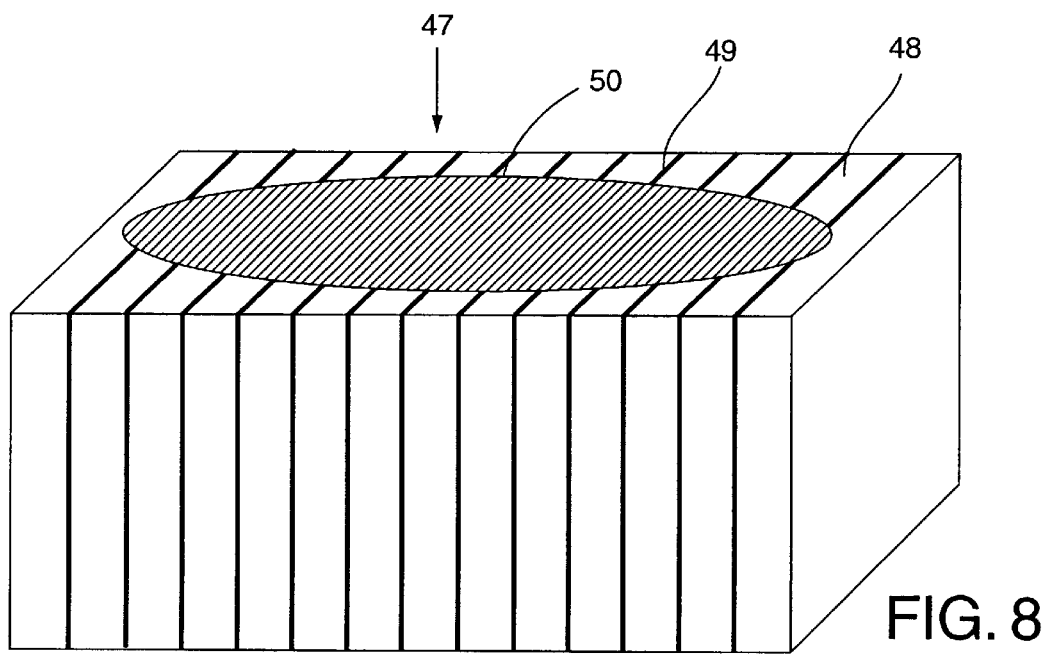
FIG. 8 shows a schematic view of an elastomer connector.

In FIG. 7 are shown the outer parts 43 and 44 of the beam 31 that include attaching arrangements 45 and 46, which are aimed to fasten the display holder 30 to the frame 42 whereon the display 36 is mounted. These attaching arrangements 45 and 46 are in FIG. 7 shown as hooks.

Figure 9:
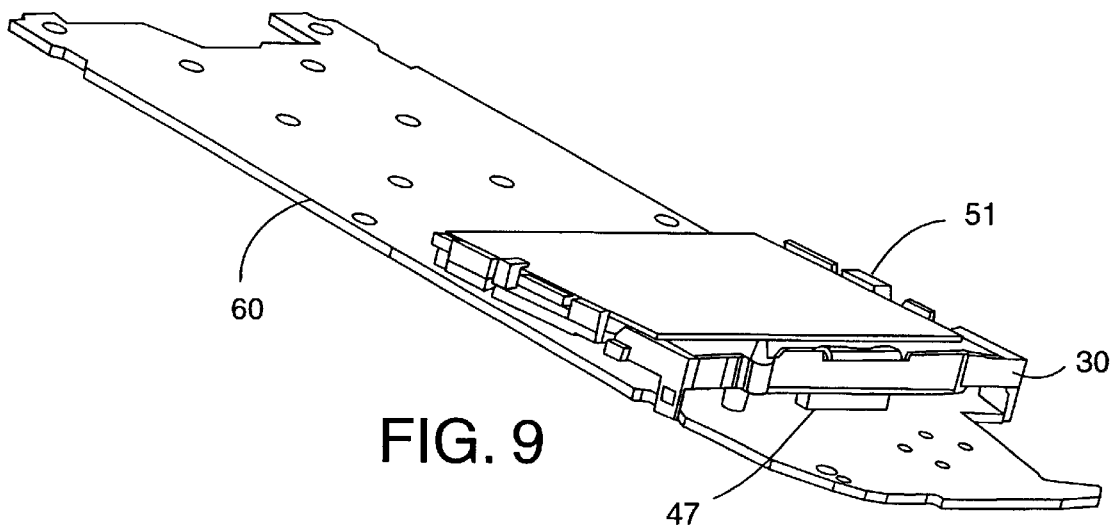
FIG. 9 shows an assembled frame placed on a printed circuit board.
Figure 10:
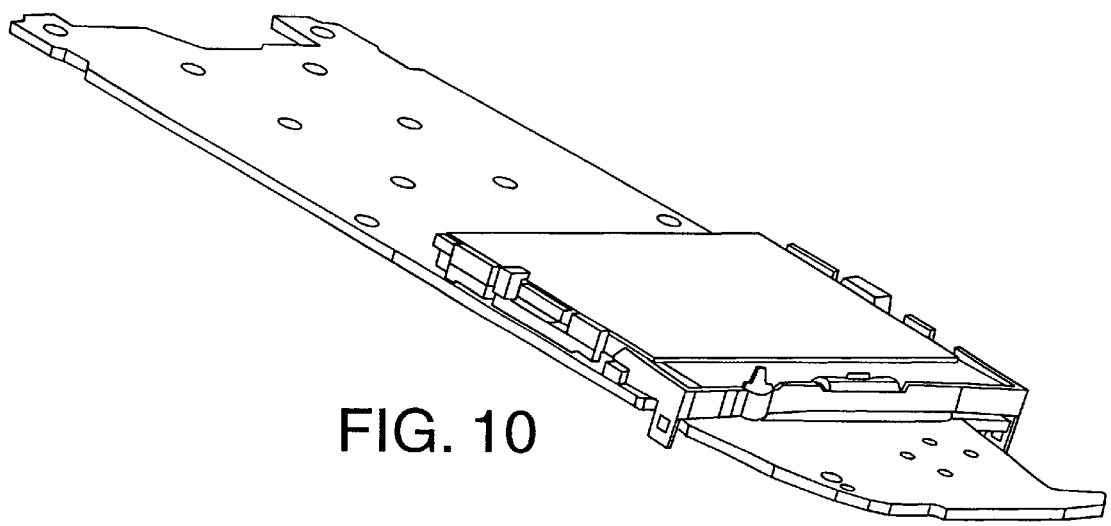
FIG. 10 shows a display holder holding a display and a printed circuit board in relation to each other.
Figure 11:
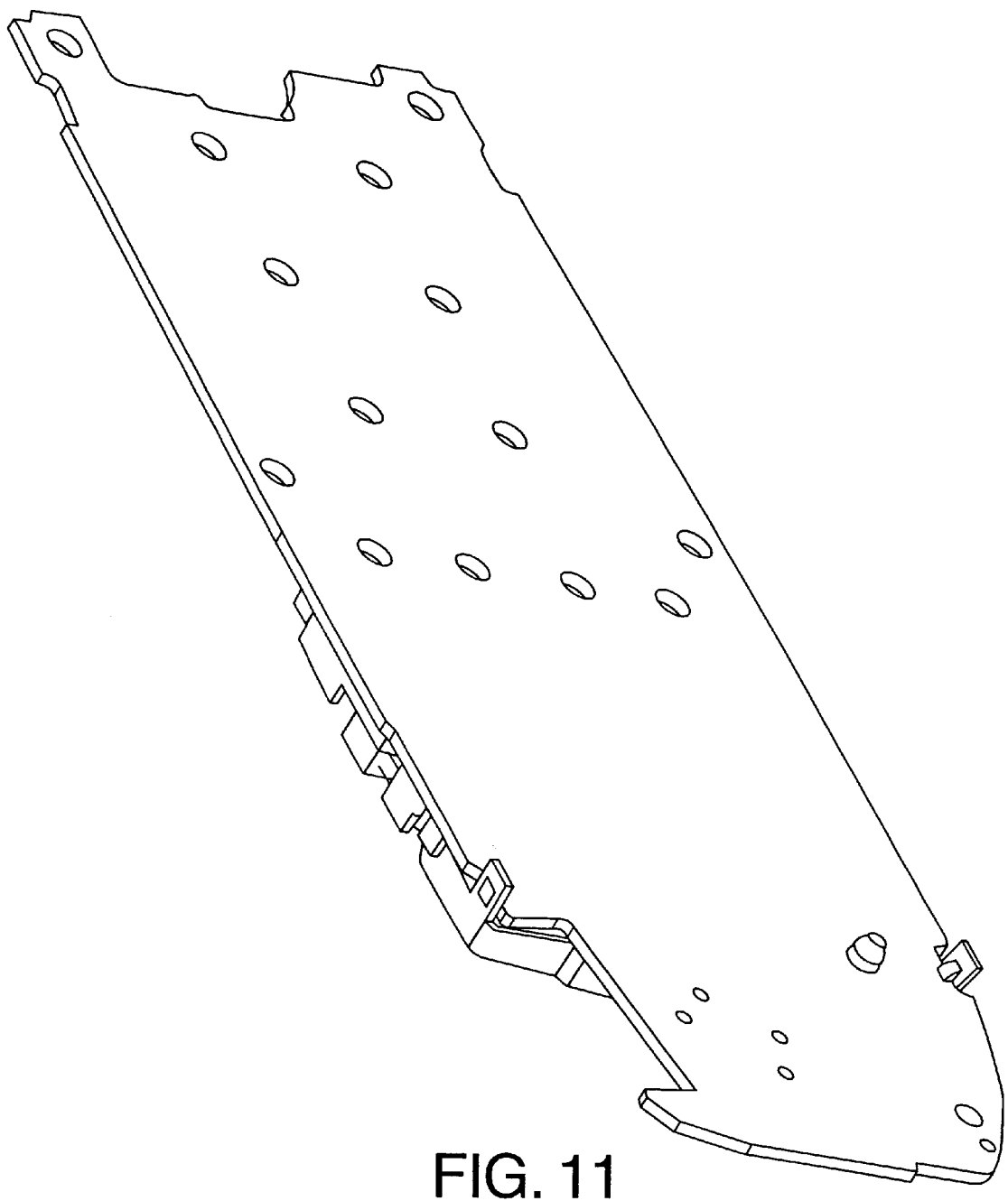
FIG. 11 shows a printed circuit board with a display holder holding a display and in relation to a printed circuit board from another view.

The connection between the display 36 and the printed circuit board 60 is in a connector part 35, where each of them connects to a joint elastomer connector 47, (see FIG. 9). The elastomer connector 47 (see FIG. 8) comprise a number of laminated elastomer parts 48, a number of laminated metal-foil parts 49 and contacts pads 50, where laminated parts 48 and 49 has the same area facing each other. The elastomer connector 47 is square having a laminated metal-foil part 49 between every laminated elastomer part 48. Both the metal-foil parts 49 and the laminated elastomer parts 48 has as mentioned above the same area so that one laminated metal-foil part 49 does not get in contact with the next laminated elastomer part, but having a laminated elastomer part 48 in between. On the surfaces of the elastomer connector 47 facing the connector parts 35 of the display 36 and the printed circuit board 60, are mounted contact pads 50 to connect to the display 36 and the printed circuit board 60. The contact pads 50 on each side of the elastomer connector 47 are connected to each other with the laminated metal-foil parts 49.

The elastomer connector 47 will be compressed when the display holder 31 is put into its place holding the display 36 in relation to the printed circuit board 60. The metal-foils 49 will bend, but still be contacted to each of the connector parts 35 on the display 36 and the printed circuit board 60. A reliable and flexible contact has been created.

This short example (see FIGS. 4, 9, 10 and 11) will describe how the display holder 31 is used to transfer a tension to the connector part 35 of a display 36 and a printed circuit board 60. The first step is to mount a display 36 onto a frame 42, e.g. light guide, whereafter the display holder 31 is fastened to the frame 42 with the hooks 45 and 46 of the beam's 32 outer part. The assembled frame 51 (see FIG. 5, 9 or 10) with a display holder 30 will be placed on a printed circuit board 60 (see FIG. 9), whereafter the assembled frame 51 will be pressed against the printed circuit board 60, and the elastomer connector 47 will be compressed. The snapping flanges 40 and 41 of the display holder 30 will be snapped over the printed circuit board 60 to finalise the mounting (see FIGS. 10 and 11). The display holder 30 has created a tension in the connector part 35.

The invention is not limited to the above described examples or to the drawings showing examples of an embodiment, but can be varied within the scope of the appended claims.

What is claimed is:

1. A display holder for holding a display in relation to a printed circuit board, comprising:
   means for snapping the display onto the printed circuit board; and
   means for transferring a tension from a snap-connection to a connector part of the display,
   wherein said means for transferring a tension comprises:
   a beam having an offset section in its vertical direction to transfer the tension from the snap-connection to the connector part of the display and the printed circuit board, supporting points, and snapping flanges,
   wherein the snapping flanges are snapped over the display and the printed circuit board to establish connection, and compresses an elastomer in the connector part, when snapping the flanges over the display and the printed circuit board.

2. A display holder for holding a display according to claim 1, wherein first and second supporting points of the beam are located on a frame whereon the display is mounted, and a third supporting point projects from the beam with the support located on the connector part, and wherein the tension is transferred from the display holder to hold the display and the printed circuit board in relation to each other.

3. A display holder for holding a display according to claim 2, wherein said beam comprises:
- a U-shaped plane with an offset vertical to said plane;
- a supporting point to support a light guide;
- a snap flange on each of outer parts of said beam; and
- a supporting point to support the connector part on the middle part of said beam,
- wherein the supporting point to support the connector part projects from said beam, and said beam is made of metal.

4. A display holder comprising:
- a beam having a U-shaped plane with an offset section vertical to said plane
- a supporting point to support a frame; and
- a snap flange on each of outer parts of said beam; and
- a supporting point to support the display on the middle part of the beam,
- wherein said supporting point to support the display projects from the beam, and said beam is made of metal.

5. A communication unit provided with a display holder for holding a display in relation to a printed circuit board, said display holder comprising:
- means for snapping the display onto the printed circuit board; and
- means for transferring a tension from a snap-connection to a connector part of the display,
- wherein said means for transferring a tension comprises:
  - a beam having an offset section in its vertical direction to transfer the tension from the snap-connection to a connector part of the display and the printed circuit board,
  - wherein said beam comprises:
    - supporting points, and
    - snapping flanges, and
  - wherein said snapping flanges are snapped over the display and the printed circuit board to establish connection, and compresses an elastomer in the connector part, when snapping the flanges over the display and the printed circuit board.

6. A communication unit according to claim 5, wherein first and second supporting points of said beam are located on a frame whereon the display is mounted, a third supporting point of said beam projects from said beam with the support located on the connector part, where the tension is transferred from the display holder to hold the display and the printed circuit board in relation to each other.

7. A communication unit according to claim 6, wherein said beam comprises:
- a U-shaped plane with an offset section vertical to said plane;
- a supporting point to support a light guide;
- a snap flange on each of outer parts of said beam; and
- a supporting point to support the connector part on the middle part of the beam,
- wherein the supporting point to support the display projects from said beam, and said beam is made of metal.

8. A method for establishing a pressure on a connector part between a display and a printed circuit board comprising the steps of:
- establishing pressure with a beam which includes an offset section in the pressure direction, supporting points and snapping flanges,
- wherein the snapping flanges are snapped over the display and the printed circuit board to establish connection; and
- compressing an elastomer in the connector part, when snapping the flanges over the display and the printed circuit board.

* * * * *